(12) United States Patent
Perez Pellitero et al.

(10) Patent No.: US 9,934,553 B2
(45) Date of Patent: Apr. 3, 2018

(54) METHOD FOR UPSCALING AN IMAGE AND APPARATUS FOR UPSCALING AN IMAGE (71) Applicant: THOMSON LICENSING, Issy les Moulineaux (FR)

(72) Inventors: Eduardo Perez Pellitero, Hannover (DE); Jordi Salvador Marcos, Hamburg (DE); Javier Ruiz Hidalgo, Barcelona (ES); Bodo Rosenhahn, Ronnenberg (DE)

(73) Assignee: THOMASON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/341,080

(22) Filed: Nov. 2, 2016

(65) Prior Publication Data

US 2017/0132759 A1 May 11, 2017

(30) Foreign Application Priority Data

Nov. 6, 2015 (EP) .................................... 15306768

(51) Int. Cl.
*G06K 9/00* (2006.01)
*G06T 3/40* (2006.01)
(Continued)

(52) U.S. Cl.
CPC .............. *G06T 3/4076* (2013.01); *G06K 9/42* (2013.01); *G06K 9/4647* (2013.01);
(Continued)

(58) Field of Classification Search
CPC ... G06T 3/4076; G06T 1/0007; G06T 3/4053; G06T 3/602; G06T 2207/20021;
(Continued)

(56) References Cited

U.S. PATENT DOCUMENTS 9,734,558 B2 * 8/2017 Porikli .................. G06T 3/4076
2011/0222783 A1 9/2011 Matsunobu et al.
(Continued)

OTHER PUBLICATIONS

Farsiu et al., "Fast and Robust Multiframe Super Resolution.", IEEE Transactions on Image Processing, vol. 13, No. 10, Oct. 1, 2004, pp. 1327-1344.
(Continued)

*Primary Examiner* — Jonathan S Lee
(74) *Attorney, Agent, or Firm* — Brian J. Dorini; Xiaoan Lu (57) ABSTRACT

Image super-resolution (SR) generally enhance the resolution of images. One of SR's main challenge is discovering mappings between low-resolution (LR) and high-resolution (HR) image patches. The invention learns patch upscaling projection matrices from a training set of images. Input images are divided into overlapping patches, which are normalized and transformed to a defined orientation. Different transformations can be recognized and dealt with by using a simple 2D-projection. The transformed patches are clustered, and cluster specific upscaling projection matrices and corresponding cluster centroids determined during training are applied to obtain upscaled patches. The upscaled patches are assembled to an upscaled image.

15 Claims, 3 Drawing Sheets

(51) Int. Cl.
  *G06K 9/42* (2006.01)
  *G06K 9/46* (2006.01)
  *G06K 9/62* (2006.01)
  *G06K 9/66* (2006.01)
  *G06T 1/00* (2006.01)
  *G06T 3/60* (2006.01)

(52) U.S. Cl.
  CPC ......... *G06K 9/6215* (2013.01); *G06K 9/6223* (2013.01); *G06K 9/66* (2013.01); *G06T 1/0007* (2013.01); *G06T 3/4053* (2013.01); *G06T 3/602* (2013.01); *G06T 2207/20021* (2013.01); *G06T 2207/20081* (2013.01)

(58) Field of Classification Search
  CPC ............ G06T 2207/20081; G06K 9/42; G06K 9/4647; G06K 9/6215; G06K 9/6223; G06K 9/66
  See application file for complete search history.

(56) References Cited

U.S. PATENT DOCUMENTS

| | | | | |
|---|---|---|---|---|
| 2013/0034271 | A1* | 2/2013 | Sakaguchi | ............ G06T 3/4053 382/107 |
| 2013/0142422 | A1* | 6/2013 | Takita | ...................... G06K 9/62 382/159 |
| 2014/0153819 | A1* | 6/2014 | Lin | ......................... G06T 5/002 382/159 |
| 2015/0269708 | A1* | 9/2015 | Porikli | .................. G06T 3/4007 382/160 |
| 2017/0076170 | A1* | 3/2017 | Tuzel | ....................... G06K 9/40 |

OTHER PUBLICATIONS

Freeman et al., "Learning Low-Level Vision", International Journal of Computer Vision, vol. 40, No. 1, Mar. 2000, pp. 25-47.

Glasner et al., "Super-Resolution from a Single Image", IEEE 12th International Conference on Computer Vision, Kyoto, Japan, Sep. 27, 2009, pp, 349-356.

Yang et al., "Exploiting Self-similarities for Single Frame Super-Resolution", 10th Asian Conference on Computer Vision, Queenstown, New Zealand, Nov. 8, 2010, pp. 497-510.

Mairal et al., "Non-local Sparse Models for Image Restoration", IEEE 12th International Conference on Computer Vision, Kyoto, Japan, Sep. 27, 2009, pp. 2272-2279.

Dong et al., "Learning a Deep Convolutional Network for Image Super-Resolution", European Conference on Computer Vision, Zurich, Switzerland, Sep. 6, 2014, pp. 184-199.

Freeman et al., "Example-Based Super-Resolution", IEEE Computer Graphics and Applications, vol. 22, No. 2, Mar./Apr. 2002, pp. 56-65.

* cited by examiner

METHOD FOR UPSCALING AN IMAGE AND APPARATUS FOR UPSCALING AN IMAGE

REFERENCE TO RELATED EUROPEAN APPLICATION

This application claims priority from European Application No. 15306768.1, entitled "Method for Upscaling An Image and Apparatus For Upscaling An Image," filed on Nov. 6, 2015, the contents of which are hereby incorporated by reference in its entirety.

FIELD OF THE INVENTION

This invention relates to patch-based image super-resolution and corresponding methods and devices for upscaling images.

BACKGROUND

Image super-resolution (SR) refers generally to techniques that enhance the resolution of images. In "Fast and robust multiframe super-resolution" [Farsiu2004], a reconstruction technique is disclosed that needs several images of the same scene with sub-pixel displacements, which are used to build a set of linear constraints for the new high-resolution (HR) pixel intensities. If enough images are provided, the set of equations is determined and can be solved to obtain the HR image. This approach, however, depends on the accuracy of the required registration process and is limited to small magnification factors.

In "Learning low-level vision" [Freeman2000], the prediction from low-resolution (LR) to HR patches is learned through a Markov Random Field and solved by belief propagation. However, these approaches require large training datasets, in the order of millions of patch pairs, thus being computationally costly.

A super-resolution algorithm disclosed in "Super-resolution from a single image" [Glasner2009] exploits cross-scale self-similarity across several scales in an image pyramid, in order to recover the high-resolution details that are missing in the low-resolution image. This algorithm cannot deal with high magnification factors and needs to perform several cascaded smaller magnification factors. Thus it is noticeably slow. One of SR's main challenge is discovering mappings between LR and HR manifolds of image patches.

SUMMARY OF THE INVENTION

The present invention is based on the recognition of the fact that improvements in the search for similar patches can substantially enhance the super-resolution process, in at least one of image quality and processing time. Thus, the invention is suitable for solving at least some of the above problems and deficiencies.

In particular, the proposed method allows very fast super-resolution upscaling of any magnification factor in a single step. Nevertheless, the invention can also be used in multi-step upscaling. The proposed solution comprises learning linear upscaling projection matrices from a training set of images. Input images are divided into overlapping patches. Before the upscaling, the patches are transformed into a domain where basic geometric transformations (such as e.g. rotation, horizontal and vertical flipping) of a given patch are removed (ie. they are transformed to a defined orientation), so that available resources are utilized more efficiently. The system is able to recognize and deal with several transformations with only one primitive projection matrix, thus resulting in a very light method in terms of memory and obtaining very fast computational times. The transformed patches are used to determine an upscaling projection matrix. An inverse transformation, which is reverse to the previous transformation and thus maps each patch back to its original orientation, is applied before or after the upscaling of the patch.

According to an embodiment of the invention, a method for upscaling an input image comprises dividing the input image into overlapping patches, normalizing the patches and transposing and/or flipping at least some of the normalized patches to obtain transposed and/or flipped normalized patches that according to predefined orientation characteristics all have the same orientation, wherein transposed and/or flipped normalized patches are obtained, and for each transposed and/or flipped normalized patch, determining a nearest neighbor patch among centroid patches of a plurality of trained clusters, and determining an upscaling projection matrix associated with the determined nearest neighbor patch, applying the determined upscaling projection matrix to the respective current transposed and/or flipped projected normalized patch, wherein a transposed and/or flipped upscaled normalized patch is obtained, applying inverse transposing and/or inverse flipping and de-normalizing to the upscaled normalized patch, according to said transposing and/or flipping and normalizing of the respective patch, wherein upscaled patches are obtained, and assembling the upscaled patches to obtain an upscaled image. The upscaled patches overlap, so that the assembling is reverse to the dividing.

In an embodiment, the method further comprises storing normalization information that is used in said normalizing the patch to obtain a normalized patch, projecting the normalized patch to a 2-dimensional (2D) value or value pair, and storing the 2-dimensional value, and depending on the 2-dimensional value, transposing and/or flipping the normalized patch to said orientation, and storing corresponding transpose/flipping indications or parameters.

An apparatus for upscaling an image, in one embodiment, is disclosed in claim 12.

In one embodiment, the invention relates to a non-transitory computer readable storage medium having stored thereon executable instructions to cause a computer to perform a method comprising dividing the input image into overlapping patches, normalizing the patches and transposing and/or flipping at least some of the normalized patches to obtain transposed and/or flipped normalized patches that according to predefined orientation characteristics all have the same orientation, wherein transposed and/or flipped normalized patches are obtained, and for each transposed and/or flipped normalized patch, determining a nearest neighbor patch among centroid patches of a plurality of trained clusters, and determining an upscaling projection matrix associated with the determined nearest neighbor patch, applying the determined upscaling projection matrix to the respective current transposed and/or flipped projected normalized patch, wherein a transposed and/or flipped upscaled normalized patch is obtained, applying inverse transposing and/or inverse flipping and de-normalizing to the upscaled normalized patch, according to said transposing and/or flipping and normalizing of the respective patch, wherein upscaled patches are obtained, and assembling the upscaled patches to obtain an upscaled image, wherein the upscaled patches overlap.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a flow-chart of an upscaling method.

DETAILED DESCRIPTION OF THE INVENTION

The invention has a training aspect and an upscaling (so-called "testing") aspect. First, the upscaling aspect is described.

Figure 1:
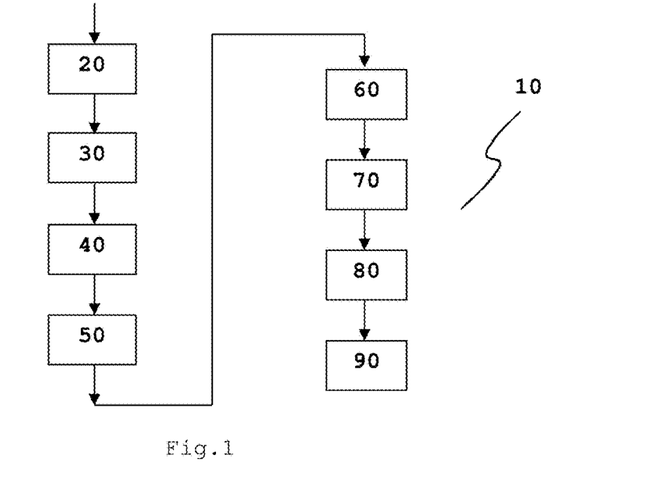

FIG. 1 shows in one embodiment a flow-chart of a method for upscaling an input image. The method 10 comprises dividing 20 the input image into overlapping patches, and normalizing 30 the patches and transposing and/or flipping 40 at least some of the normalized patches to obtain transposed and/or flipped normalized patches that according to predefined orientation characteristics all have the same orientation, wherein transposed and/or flipped normalized patches are obtained. Then, for each transposed and/or flipped normalized patch, a nearest neighbor patch is determined 50 among centroid patches of a plurality of trained clusters, and an upscaling projection matrix associated with the determined nearest neighbor patch is determined 60. The determined upscaling projection matrix is applied 70 to the respective current transposed and/or flipped projected normalized patch, wherein a transposed and/or flipped upscaled normalized patch is obtained. Then, inverse transposing and/or inverse flipping and de-normalizing is applied 80 to the upscaled normalized patch, according to said transposing and/or flipping and normalizing of the respective patch, wherein upscaled patches are obtained. Finally, the upscaled patches are assembled 90 according to their position to obtain the upscaled image, wherein the upscaled patches overlap (corresponding to the overlap of the patches of the input image, e.g. 25%, 33%, 50% etc., or by 1, 2, 3 or any defined number of pixels).

The disclosed super-resolution method works by, first, dividing the input image into small overlapping patches, which may but need not be square. Then, in an embodiment, the mean value of each patch is computed, stored and subtracted from the patch. Afterwards, the norm of each patch is computed and each patch value divided by this value, so that a normalized patch is obtained. The term "norm" refers to a vector norm (ie. vector length), assuming that the patches are vectorized (ie. values of all pixel of the patch are put into a vector). The resulting patches go through a rotation and flipping removal stage where:

(1) they are projected into 2-dimensional points (i.e. transformed to obtain a value pair), (2) in this new representation, the presence of rotation and flipping is extracted and indicated as e.g. 3-bit "instructions" that label the patches as rotated, transposed and/or flipped, and (3) all the patches that are labelled as rotated, transposed and/or flipped are erased after applying the instructions that neutralize the rotation and flipping, and replaced by their "neutralized" form. Those instructions are kept associated for each patch for later use.

Figure 2:
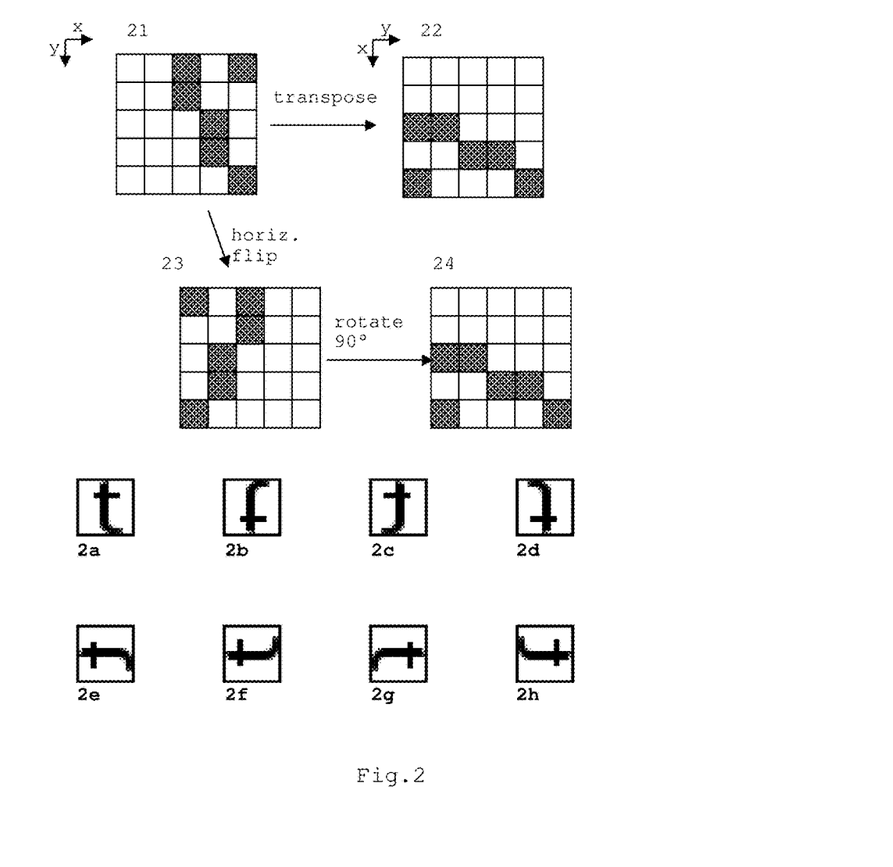
FIG. 2 an example of patch transposition.

Note that "transpose" refers to a matrix representation of a patch, and the transposed patch is obtained by swapping columns and rows of the patch. FIG. 2, in its upper part, shows a simple example of a 5×5 patch 21 and its transpose 22. Each column in the original patch 21 corresponds to a row in the transposed patch 22, and vice versa. It is clear that transposing is equivalent to flipping and subsequent rotation (or vice versa). E.g. the transpose of the example shown in FIG. 2 can also be obtained by either horizontal flipping 23 and subsequent 90° counterclockwise rotating 24. In the lower part, FIG. 2 shows how a square patch 2a can be transformed in several geometric ways without filtering or interpolating its values while preserving the same structure. In the example, the square patch contains the letter "t". The transformations contain 90 degrees rotation 2f, horizontal flipping 2c and vertical flipping 2b, and combinations of them. This results in eight different patches 2b, ..., 2h that can be derived from (or mapped to) the same structure primitive 2a. The invention maps such corresponding patches, such as 2b, ..., 2h, to a primitive patch such as 2a, and clusters the patches after this mapping.

After the rotation and flipping removal ("neutralization") stage, a projection matrix is selected from within a trained set of low-resolution (LR) to high-resolution (HR) projection matrices, and applied to each patch as a matrix multiplication.

The training is performed with LR and HR training patches of training images. During the training, an upscaling projection matrix is found for each cluster and associated with the respective cluster representative. The upscaling projection matrix typically provides a good match between the LR and corresponding HR training patches of the cluster. After the training, the cluster representatives are associated with corresponding learned/trained upscaling projection matrices. Now, in principle, the training can be finished and only the cluster representatives and their respective associated upscaling projection matrices are kept. During upscaling, the upscaling projection matrix for an input patch is found by comparing the input patch, which is considered as LR, to the available cluster representatives. For a cluster representative that matches the given input patch best, its associated upscaling projection matrix is used for upscaling the input patch.

At this point, the instructions applied to the patch are reverted, so that the rotations and flips are restored to the original patch appearance, and the upscaled (or HR) input patch gets the same orientation that its LR input patch initially had. A weighted reconstruction stage of the overlapping patches is performed in the last stage to recover the full image.

Figure 3:
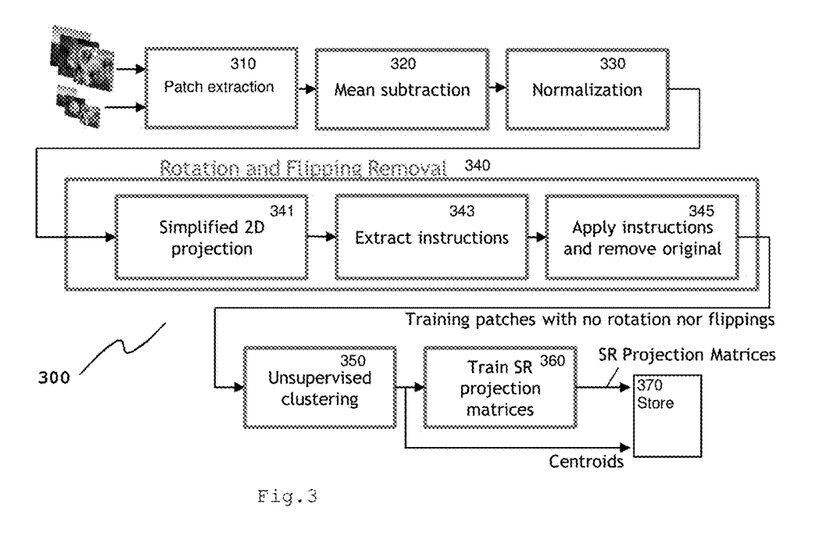
FIG. 3 a flow-chart of an exemplary training process.

In an embodiment shown in FIG. 3, the disclosed upscaling is composed by two stages. An offline training 300, for which an exemplary flow diagram is shown in FIG. 3, needs to be performed only once. In an embodiment, the training 300 is applied to LR training images and comprises patch extraction 310, wherein each training image is divided into overlapping patches, mean subtraction 320, normalization 330 and rotation and flipping removal 340 of each patch. The rotation and flipping removal 340 comprises performing a simplified 2D projection 341, extracting instructions 343 according to the simplified 2D projection 341, and applying the instructions to the LR training patches 345. This results in "neutralized" (rotated, transposed and/or flipped) LR training patches. The original LR training patches can then be removed. These steps are performed for all LR training patches of all training images, and the neutralized patches are clustered by (unsupervised) clustering 350. Using the clustered LR training patches and their respective HR counterparts from the training data set, a SR projection matrix (ie. upscaling projection matrix) is determined 360 for each cluster in a training stage. An upscaling projection matrix that provides a good, or even an optimal, mapping between the LR and HR training patches is associated with the cluster. After the upscaling projection matrix is found, most of the patches in the cluster are not needed any more. Only a single patch remains, while the other patches are removed. In one embodiment, the remaining patch is the centroid of the cluster. In other embodiments, it can be derived from the patches of the cluster in various manners, as long as it can be considered as representative of them. It can be created from the clustered patches (e.g. by averaging them), or selected from the clustered patches (e.g. by selecting an existing patch that is closest to an average patch), before their removal. The representative patch and the derived upscaling projection function are the result of the training and are stored 370.

As described above, in an embodiment the training stage comprises normalization, ie. patch extraction, mean subtraction, numeric normalization, and neutralization, ie. transpose and/or flipping removal. Further, the training stage comprises clustering, the determination of cluster centroids and the determination of upscaling projection matrices for each cluster.

In patch extraction during training, patches from LR and HR versions of the same image are extracted. E.g. a LR training image can be obtained by simply downscaling a corresponding given HR image. During training patch extraction, a matrix of downscaled vectorized patches P and another matrix of the same number of columns of vectorized ground truth HR patches (denoted GT) are obtained.

In an embodiment, the clustering 350 comprises running a spherical k-means clustering process, which is adapted for normalized data, with the training set of extracted LR patches. In other embodiments, any other supervised or unsupervised clustering may be used. The clustering 350 generates a set of k clusters and their respective centroids.

As one part of the training process 300, SR upscaling projection matrices are determined. For each of the clusters, an upscaling projection matrix M is trained using the LR and HR patches obtained during the patch extraction. In one embodiment, the matrix is obtained according to $$M_{cluster} = GT_{cluster}/P_{cluster}$$

Herein, $M_{cluster}$ is the upscaling projection matrix of a cluster, $GT_{cluster}$ is a ground truth patch (e.g. the centroid) and $P_{cluster}$ is the corresponding LR patch.

In other embodiments, obtaining the upscaling projection matrix comprises averaging of a plurality of upscaling projection matrices, averaging of ground truth patches and LR patches, or other techniques.

Figure 4:
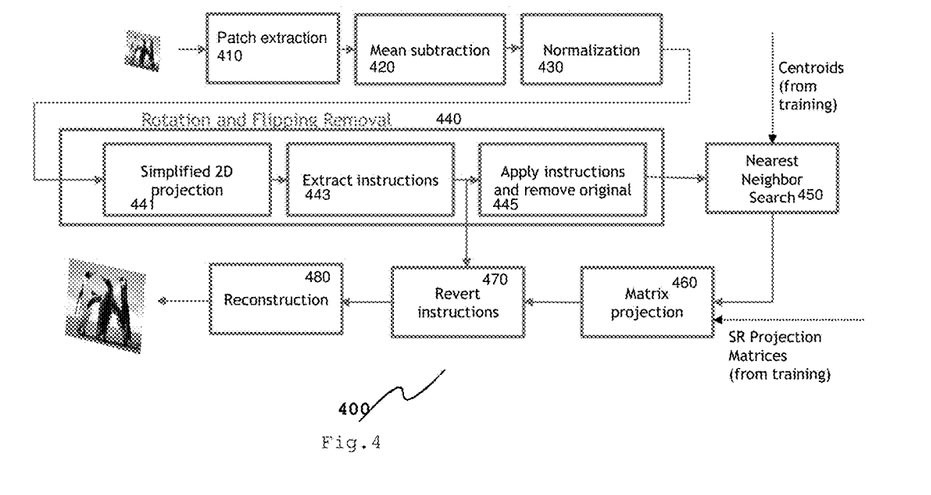
FIG. 4 a flow-chart of an exemplary upscaling process.

An upscaling stage 400, also referred to as online testing stage, is performed for every image to be upscaled. An exemplary flow diagram is shown in FIG. 4. In an embodiment, the upscaling 400 is applied to LR input images and comprises patch extraction 410, and then mean subtraction 420, normalization 430 and transpose/flipping removal 440 of each patch. The transpose/flipping removal 440 comprises performing a simplified 2D projection 441, extracting instructions 443 according to the simplified 2D projection 441, and applying 445 the instructions to the LR input image patches. This results in "neutralized" (rotated, transposed and/or flipped) LR input image patches. While the described steps can be similar or equal to the corresponding steps performed during training 300, the following steps differ. Next, each neutralized LR input image patch is compared with the cluster centroids in a Nearest Neighbor Search 450. Once the Nearest Neighbor among the centroids is found, its associated trained upscaling projection matrix is provided to a matrix projection stage 460, which applies the upscaling projection matrix to the neutralized LR input image patch, thus generating a neutralized HR image patch. The neutralized HR image patch is de-neutralized (ie. inverse rotated, inverse transposed and/or inverse flipped) 470 by reverting the previously stored instructions that were extracted in the extracting instructions step 443. As a result, HR image patches in their correct orientation are obtained. These are used in a reconstruction step 480 to assemble the desired upscaled image. In the reconstruction 480, the HR patches overlap according to the overlap that was used in the patch extraction step 410.

As described above, first, both in the training phase and upscaling phase, each input image is divided into overlapping patches. Then, the mean value of each patch is subtracted from each pixel. The mean value is stored for later use (ie. for later de-normalizing the patch after its upscaling). Then, the patch is normalized according to its norm (ie. vector length, see above). The normalization is an additional improvement, but not necessarily required in all embodiments of the invention. The normalized patches are reoriented, as described above. The reoriented patches are classified into classes, e.g. a predefined number of classes or a user-defined number of classes, e.g. 1024, using any clustering technique such as e.g. spherical hashing, k-means or classifications trees. The number of clusters can be used as a parameter for tuning the upscaling algorithm.

Figure 5:
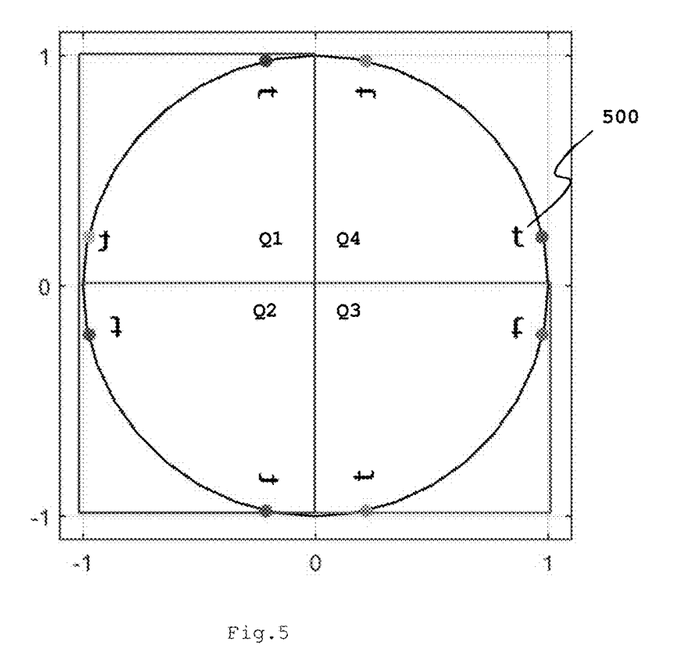
FIG. 5 different rotations and flippings in a 2D transformed space.

FIG. 5 shows different rotations and flippings represented in the 2-dimensional transformed space. Different appearances of the exemplary patch as shown in the lower part of FIG. 2 are shown in quadrants Q1, . . . , Q4 of the transform space. The various appearances can be mapped to a single appearance that has a given orientation, e.g. to the letter "t" 500. E.g. by horizontal flipping, quadrants Q1,Q2 are mapped to quadrants Q3,Q4, and vice versa. Similarly, by vertical flipping the quadrants Q1,Q4 are mapped to quadrants Q2,Q3, and vice versa. By counter-clockwise 90° rotation, quadrants Q1,Q2,Q3,Q4 are mapped to quadrants Q2,Q3,Q4,Q1. Thus, it becomes clear that these appearances of patches, after the transform, are actually equivalent in terms of similarity. In other words, they are a transform group of eight points in an m-dimensional manifold of patches, as defined by symmetries. By the disclosed technique, the clustering of the patches will be more effective, because more similar patches to a given patch will be found. For a given number of training patches, all clusters will be in one half of one quadrant, e.g. the lower half of Q1 (the one where the original patch "t" 500 is), and each cluster will be more populated than in conventional systems where clusters may be anywhere on the circle. This finally provides better matching clusters, better matching cluster centroids and better matching upscaling matrices.

In the training phase, the unsupervised clustering process may be any clustering process, e.g. the well-known k-means clustering. In both the training and the upscaling, the transpose/flipping removal results in less clusters and better matching centroids.

One aspect of the invention relates to obtaining transposed and/or flipped normalized patches that, according to predefined orientation characteristics, all have the same orientation. These predefined orientation characteristics are derived from the pattern of the patch. In an embodiment, a simple 2-dimensional (2D) projection is performed to a given patch p of dimension N*M, according to $$X = \sum_{m=0}^{M-1} \sum_{n=0}^{N-1} p[m,n] \cos\left(\frac{\pi}{M}\left(m + \frac{1}{2}\right)\right)$$

and $$Y = \sum_{m=0}^{M-1} \sum_{n=0}^{N-1} p[m,n] \cos\left(\frac{\pi}{N}\left(n + \frac{1}{2}\right)\right)$$

where p[m,n] is the value (e.g. luminance value) of a pixel at a position m,n within the patch. In principle, Discrete Cosine Transforms (DCT) are applied to the patch to obtain the numeric values X,Y. These numeric values X,Y indicate, in principle, the region (ie. transform space quadrant) where the respective pattern is located. Thus, the required transform back to the "original" orientation 500, ie. rotation, translation and/or flipping, can be easily derived from these values. The transform can be encoded in various manners. E.g. each instruction can be composed by three bits that correspond to transformations that can be present in each patch: a vertical flip bit, a horizontal flip bit and a transpose bit.

First bit—Up-to-down flip: If the vertical component Y is negative, the patch has been vertically flipped, and therefore the vertical flip bit is set to 1.

Second bit—Left-to-right flip: If the horizontal component X is negative, the patch has been vertically flipped, and therefore the horizontal flip bit is set to 1.

Third bit—Transpose: If the horizontal component X is smaller than the vertical component Y, the patch has been transposed, and therefore the transpose bit is set to 1. As described above, the transpose can be replaced by rotation and flipping. In embodiments that use different encoding, the third bit may indicate a specific rotation, e.g. 90°. Where transpose is mentioned herein (such as e.g. transpose instructions, transpose removal, transpose/flipping module, transpose/flipping instructions storage module), "transpose" can be replaced by "rotation". Once the transform instructions have been extracted, they are applied to the patches, so that all the flippings and rotations are removed. E.g. in an embodiment shown in FIG. 5, points that correspond to all the patches shown in FIG. 2 (ie. their X,Y) will be mapped to the un-rotated and un-flipped "t" 500 (its X,Y) on the upper right quadrant Q4, and the instructions are saved together with the patch for later use. After upscaling, the patch will be reverted according to this information, ie. it will be mapped back to the quadrant where it was originally located. E.g. if the original patch looks like 2h) of FIG. 2, it is in the lower end of quadrant Q2. It may be horizontally flipped to Q3 and rotated by 90° to arrive at the original 500. Its corresponding upscaled patch will be rotated back by −90° and then horizontally flipped, thus coming back to the orientation of the input patch in Q2.

During Nearest Neighbor Search, the patch is compared with all the centroids obtained during training. This may be achieved e.g. by using an absolute value of the dot product. The centroid that has the highest similarity is chosen as "best-match", and its associated upscaling projection matrix is used for upscaling projection of the patch.

During matrix projection, the low-to-high resolution upscaling projection matrix associated with the best-matching centroid is used to upscale the low-resolution patch, which is vectorized for that purpose (ie. all columns or rows are appended to obtain a single column or row).

upscaled patch=M*p

Here, M is the upscaling projection matrix and p is the vectorized LR patch.

At the revert instructions stage 470, the instructions (transpose/rotation, vertical flip, horizontal flip) associated with the patch are reverted (i.e. applied again reversely) so that the patch comes back to its initial appearance, as in the above example.

During reconstruction 480, the overlapping upscaled patches are accumulated and averaged on the output upscaled image.

Figure 6:
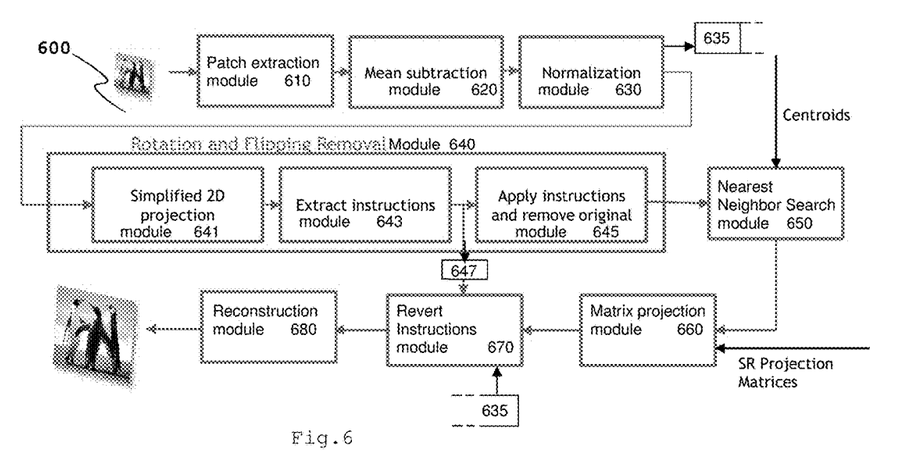
FIG. 6 a block diagram of an apparatus for upscaling.

FIG. 6 shows the structure of an apparatus for upscaling an input image. In this embodiment, the apparatus 600 comprises at least one processor and a memory storing instructions that, when executed by the at least one processor, implement on the at least one processor the following modules:

a patch extraction module 610 being adapted for dividing the input image into overlapping patches, and extracting said patches, a mean subtraction module 620 being adapted for subtracting a patch mean value from each of the patches of the input image to obtain mean subtracted patches, a normalization module 630 being adapted for normalizing the mean subtracted patches to obtain normalized patches, a normalization information storage module 635 being adapted for storing normalization information (including the subtracted mean value information, in some embodiments), a transpose/flipping module 640 being adapted for obtaining transposed and/or flipped normalized patches that all have the same orientation (ie. an orientation given by the above-described 2D projection resulting in X,Y), the transpose/flipping module 640 comprising:

a 2D projection module 641 being adapted for projecting, for each of the normalized patches, a current normalized patch to a 2-dimensional value or value pair;

a patch transpose/flipping instructions extraction module 643 being adapted for extracting instructions for transposing and/or flipping the normalized patches to a given orientation, according to the respective 2-dimensional value of each normalized patch; and an orientation neutralization module 645 being adapted for applying the transpose/flipping instructions received from the patch transpose/flipping instructions extraction module 643 to each current patch, wherein transposed and/or flipped (ie. orientation neutralized) patches are obtained, further a transpose/flipping instructions storage module 647 being adapted for storing transpose/flipping instructions or indications received from the patch transpose/flipping instructions extraction module 643, a nearest neighbor search module 650 being adapted for determining, for each transposed and/or flipped normalized patch, a nearest neighbor patch among stored centroid patches of a plurality of trained clusters, wherein an upscaling projection matrix is associated with the centroid patch of each trained cluster, and wherein the centroid patch and the upscaling projection matrix result from a training process, a matrix projection module 660 being adapted for applying the upscaling projection matrix associated with the determined nearest neighbor patches to the current transposed and/or flipped projected normalized patches, wherein transposed and/or flipped upscaled normalized patches are obtained, a reverting module 670 being adapted for reverting the transposed and/or flipped upscaled normalized patch to obtain an upscaled patch, according to the respective flipping/transpose indication retrieved from the transpose/flipping instructions storage module 647 and the respective normalization information retrieved from the normalization information storage module 635, and an image reconstruction module 680 being adapted for assembling the upscaled patches to reconstruct an upscaled image. The upscaled patches overlap, as described above.

The nearest neighbor search module 650 may comprise a comparison module for comparing one or more current transposed and/or flipped normalized patches with stored centroid patches of a plurality of trained clusters.

The nearest neighbor search module 650 or the matrix projection module 660 may comprise an upscaling projection matrix retrieval module being adapted for retrieving the stored upscaling projection matrix that is associated with the determined centroid patch.

The transpose/flipping instructions storage module 647 may but needs not be comprised in the transpose/flipping module 640.

The invention is particularly adapted for regression-based SR. Regression is generally understood as a way of finding or defining a relationship between variables (HR and LR patches, in the case of image SR). During training, a set of regression matrices is determined that are then applied during the "online" upscaling stage. Thus, the upscaling stage is faster. Regression based SR goes in contrast with e.g. sparse coding or locally linear embedding based SR, where relationships between patches are obtained during the "online" stage, thus making the process costlier and slower.

Various further embodiments of the invention are described below.

In an embodiment, an apparatus for upscaling an input image comprises one or more hardware elements, each hardware element implementing one or more of the modules described above with reference to FIG. 6.

The used image patches are small compared to the image size. E.g. patches may have a size between 4×4 pixel and 25×25 pixel, or between 0.1% and 2% of the image width. Patches may be rectangular, square or non-square. Patch overlap may be from one pixel row/column up to over 50% of the patch size.

In an embodiment, a method for upscaling an input image comprises dividing the input image into overlapping patches and obtaining transposed and/or flipped normalized patches that all have the same orientation. The obtaining transposed and/or flipped normalized patches that all have the same orientation is done by performing, for each patch of the input image, the following: normalizing the patch to obtain a normalized patch, storing normalization information, projecting the normalized patch to a 2D value or value pair, and storing the 2D value, and according to the 2D value, transposing and/or flipping the normalized patch to a given orientation, wherein a transposed and/or flipped normalized patch is obtained, and storing corresponding transpose/flipping indications.

In one embodiment, the method further comprises, for each transposed and/or flipped normalized patch, determining a nearest neighbor patch among centroid patches of a plurality of trained clusters, wherein an upscaling projection matrix is associated with the centroid patch of each trained cluster, and wherein the centroid patch and the upscaling projection matrix result from a training process, applying the upscaling projection matrix associated with the determined nearest neighbor patch to the current transposed and/or flipped projected normalized patch, wherein a transposed and/or flipped upscaled normalized patch is obtained, reverting the transposed and/or flipped upscaled normalized patch according to the respective transpose/flipping indication and normalization information to obtain an upscaled patch, and assembling the upscaled patches to obtain an upscaled image, wherein the upscaled patches overlap.

In one embodiment, an apparatus for upscaling an input image, comprising a processor and a memory storing instructions that, when executed by the processor, cause the processor to perform a method for upscaling an input image, a method as described above.

In one embodiment, an apparatus for upscaling an input image comprises at least one processor and a memory storing instructions that, when executed by the processor, cause the processor to perform a method for upscaling an input image, the method comprising dividing the input image into overlapping patches, obtaining transposed and/or flipped normalized patches (that all have the same orientation) by performing, for each patch of the input image, the steps of:

normalizing the patch to obtain a normalized patch, storing corresponding normalization information, projecting the normalized patch to a 2D value (or value pair), and storing the 2D value, according to the 2D value, transposing and/or flipping the normalized patch to a given orientation, wherein a transposed and/or flipped normalized patch is obtained, and storing corresponding transpose/flipping indications, for each transposed and/or flipped normalized patch, performing the steps of determining a nearest neighbor patch among centroid patches of a plurality of trained clusters, wherein an upscaling projection matrix is associated with the centroid patch of each trained cluster, and wherein the centroid patch and the upscaling projection matrix result from a training process, applying the upscaling projection matrix associated with the determined nearest neighbor patch to the current transposed and/or flipped projected normalized patch, wherein a transposed and/or flipped upscaled normalized patch is obtained, reverting the transposed and/or flipped upscaled normalized patch according to the respective transpose/flipping indication and normalization information to obtain an upscaled patch, and assembling the upscaled patches to obtain an upscaled image, wherein the upscaled patches overlap.

Referring to FIG. 3 again, in another embodiment a method 300 for training a learning-based image upscaler using training image pairs (wherein each training image pair has a LR image and a HR image) comprises dividing 310 the LR and the HR input image into corresponding overlapping patches (wherein the patches are small compared to the image size), and, for each LR patch:

normalizing 320,330 the LR patch to obtain a normalized patch, projecting 341 the normalized patch to a 2D value, and, according to the 2D value, transposing and/or flipping 345 the normalized patch, wherein a transposed and/or flipped projected normalized patch is obtained, clustering 350 the transposed and/or flipped projected normalized patches according to similarity, wherein the clustering may comprise determining a centroid patch and a projection matrix for each cluster, for each cluster, deriving an upscaling projection function 360 using a learning algorithm that is based on correspondences between the clustered LR patches and their respective HR patches, and for each cluster, storing 370 the centroid and the derived upscaling projection function. The storage of the centroid and the derived upscaling projection function may use a structure or an indication indicating that both belong together, e.g. a centroid value and coefficients of its associated upscaling projection function are stored in the same storage location, ie. under a common address. These coefficients can be understood as matrix elements of a matrix that is multiplied with the LR patch for upscaling it, as described above. In an embodiment, any simplified normalizing 320,330 that comprises a kind of mean adjustment 320 and a kind of range adjustment 330 can be used. In an embodiment, the projecting 341 can be any suitable operation that provide information equivalent to the DCT coefficients, and/or the 2D value can be any two bit value.

The use of the verb "comprise" and its conjugations herein does not exclude the presence of elements or steps other than those stated in a claim. Furthermore, the use of the article "a" or "an" preceding an element does not exclude the presence of a plurality of such elements. "Modules" may be hardware or software items. Several "means" or "modules" may be represented by the same item of hardware or software. Furthermore, the invention resides in each and every novel feature or combination of features.

The term "upscaling" as used herein does not describe a mere mathematical abstraction, but instead denotes information embodied in or carried by a physical medium capable of detection by a machine or apparatus. This term includes recorded or transmitted signals, and should be understood to include conveyance by any form of encoding, including but not limited to pulse code modulation (PCM).

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art, within the scope of the present invention. It is expressly intended that all combinations of those elements that perform substantially the same function in substantially the same way to achieve the same results are within the scope of the invention.

Substitutions of elements from one described embodiment to another are also fully intended and contemplated. It will be understood that the present invention has been described purely by way of example, and modifications of detail can be made without departing from the scope of the invention. Each feature disclosed in the description and (where appropriate) the claims and drawings may be provided independently or in any appropriate combination.

Features may, where appropriate be implemented in hardware, software, or a combination of the two. Connections may, where applicable, be implemented as wireless connections or wired, not necessarily direct or dedicated, connections. Reference numerals appearing in the claims are by way of illustration only and shall have no limiting effect on the scope of the claims.

CITED REFERENCES

[Farsiu2004] "Fast and robust multiframe super-resolution.", S. Farsiu, M. D. Robinson, M. Elad, and P. Milanfar

[Freeman2000] "Learning low-level vision", W. T. Freeman, E. C. Pasztor, and O. T. Carmichael, International Journal of Computer Vision, 40(1):25-47, 2000.

[Glasner2009] "Super-resolution from a single image", D. Glasner, S. Bagon, and M. Irani, in Proceedings of IEEE Int. Conf. on Computer Vision, 2009, pp. 349-356.

The invention claimed is:

1. A method for upscaling an input image, comprising
dividing the input image into overlapping patches;
normalizing the patches and transposing and/or flipping at least some of the normalized patches to obtain transposed and/or flipped normalized patches that according to predefined orientation characteristics all have the same orientation, wherein transposed and/or flipped normalized patches are obtained; and
for each transposed and/or flipped normalized patch,
determining a nearest neighbor patch among centroid patches of a plurality of trained clusters, and determining an upscaling projection matrix associated with the determined nearest neighbor patch;
applying the determined upscaling projection matrix to the respective current transposed and/or flipped projected normalized patch, wherein a transposed and/or flipped upscaled normalized patch is obtained;
applying inverse transposing and/or inverse flipping and de-normalizing to the upscaled normalized patch, according to said transposing and/or flipping and normalizing of the respective patch, wherein upscaled patches are obtained; and
assembling the upscaled patches to obtain an upscaled image, wherein the upscaled patches overlap.

2. The method according to claim 1, wherein said normalizing the patch results in a normalized patch, and wherein the transposed and/or flipped normalized patches that all have the same orientation are obtained by performing, for each patch of the input image, the steps of:
storing normalization information used in the normalizing; and
projecting the normalized patch to a 2-dimensional value or value pair, the 2-dimensional value being used in said transposing and/or flipping the normalized patch to said orientation, wherein a transposed and/or flipped normalized patch is obtained, and
storing corresponding transpose/flipping indications;
and wherein, in determining a nearest neighbor patch among centroid patches of a plurality of trained clusters, the centroid patch and the associated upscaling projection matrix result from a training process;
and wherein said applying inverse transposing and/or inverse flipping and de-normalizing to the upscaled normalized patch is done according to the respective transpose/flipping indication and normalization information.

3. Method according to claim 2, wherein said projecting the normalized patch to a 2-dimensional value comprises multiplying the patch with a projection matrix, wherein each pixel of the patch is multiplied with an element of the projection matrix, and wherein a 2-dimensional value or two scalar values are obtained.

4. Method according to claim 2, wherein, in said transposing and/or flipping the normalized patch to a given orientation, each 2-dimensional value comprises at least two numeric values, wherein a first of the numeric values determines whether or not the patch is to be horizontally flipped, and a second of the numeric value determines whether or not the patch is to be vertically flipped, and a third of the numeric values, or said first and second numeric values together, indicate whether or not the patch is to be transposed.

5. Method according to claim 2, further comprising a step of retrieving the stored transpose/flipping indication and the stored normalization information of the corresponding input patch, wherein the transposal and/or flipping is reverted according to the retrieved transpose/flipping indication and then a de-normalization is performed according to the retrieved normalization information.

6. Method according to claim 1, wherein said normalizing the patch comprises
calculating a mean value;
subtracting the mean value from each pixel; and
storing the mean value as normalization information.

7. Method according to claim 1, wherein said predefined orientation characteristics are calculated by a simplified 2D projection according to $$X = \sum_{m=0}^{M-1} \sum_{n=0}^{N-1} p[m,n] \cos\left(\frac{\pi}{M}\left(m + \frac{1}{2}\right)\right)$$

and $$Y = \sum_{m=0}^{M-1} \sum_{n=0}^{N-1} p[m,n] \cos\left(\frac{\pi}{N}\left(n + \frac{1}{2}\right)\right)$$

wherein p[m,n] represents values of pixels of the patch, and wherein a patch is vertically flipped if Y is negative, and a patch is horizontally flipped if X is negative, and a patch is transposed if X<Y.

8. A method for training a learning-based image upscaler using training image pairs, each training image pair having a LR image and a HR image, comprising
dividing the LR and the HR input image into corresponding overlapping patches;
and, for each LR patch:
normalizing the LR patch to obtain a normalized patch; and
projecting the normalized patch to a 2-dimensional value;
according to the 2-dimensional value, transposing and/or flipping the normalized patch, wherein a transposed and/or flipped projected normalized patch is obtained;
clustering the transposed and/or flipped projected normalized patches according to similarity;
determining a centroid patch and a projection matrix for each cluster;
for each cluster, deriving an upscaling projection function using a learning algorithm that is based on correspondences between the clustered LR patches and their respective HR patches; and
for each cluster, storing the centroid and the derived upscaling projection function.

9. Method according to claim 8, wherein said projecting the normalized patch to a 2-dimensional value comprises multiplying the patch with a projection matrix, wherein each pixel is multiplied with an element of the matrix, and wherein a 2-dimensional value or two scalar values are obtained.

10. The method according to claim 8, wherein said 2-dimensional value comprises at least two numeric values, with one of the numeric values determining whether or not the patch is to be horizontally flipped, and a second of the numeric value determines whether or not the patch is to be vertically flipped, and a third of the numeric values, or said first and second numeric values together, indicate whether or not the patch is to be transposed.

11. The method according to claim 8, wherein the clustering uses k-means clustering.

12. An apparatus for upscaling an input image, comprising at least one processor and a memory storing instructions that, when executed by the at least one processor, implement on the at least one processor
a patch extraction module being adapted for extracting overlapping patches from the input image;
a mean subtraction module being adapted for subtracting a mean value from each of the patches of the input image to obtain mean subtracted patches;
a normalization module being adapted for normalizing the mean subtracted patches to obtain normalized patches;
a normalization information storage module being adapted for storing normalization information and the subtracted mean values;
a transpose/flipping module being adapted for obtaining transposed and/or flipped normalized patches that all have the same orientation, the transpose/flipping module comprising
a 2D projection module being adapted for projecting, for each of the normalized patches, a current normalized patch to a 2-dimensional value or value pair;
a patch transpose/flipping instructions extraction module being adapted for extracting instructions for transposing and/or flipping the normalized patches to a given orientation, according to the respective 2-dimensional value of each normalized patch; and
an orientation neutralization module being adapted for applying the transpose/flipping instructions received from the patch transpose/flipping instructions extraction module to each current patch, wherein transposed and/or flipped patches are obtained;
a transpose/flipping instructions storage module being adapted for storing transpose/flipping instructions or indications received from the patch transpose/flipping instructions extraction module;
a nearest neighbor search module being adapted for determining, for each transposed and/or flipped normalized patch, a nearest neighbor patch among stored centroid patches of a plurality of trained clusters, wherein an upscaling projection matrix is associated with the centroid patch of each trained cluster, and wherein the centroid patch and the upscaling projection matrix result from a training process;
a matrix projection module being adapted for applying the upscaling projection matrix associated with the determined nearest neighbor patches to the current transposed and/or flipped projected normalized patches, wherein transposed and/or flipped upscaled normalized patches are obtained;
a reverting module being adapted for reverting the transposed and/or flipped upscaled normalized patch to obtain an upscaled patch, according to the respective flipping/transpose indication retrieved from the transpose/flipping instructions storage module (647) and the respective normalization information retrieved from the normalization information storage module; and
an image reconstruction module being adapted for assembling the upscaled patches to obtain an upscaled image, wherein the upscaled patches overlap.

13. The apparatus according to claim 12, wherein the nearest neighbor search module comprises a comparison module for comparing one or more current transposed and/or flipped normalized patches with stored centroid patches of a plurality of trained clusters.

14. The apparatus according to claim 12, wherein the nearest neighbor search module or the matrix projection module comprises an upscaling projection matrix retrieval module being adapted for retrieving the stored upscaling projection matrix that is associated with the determined centroid patch.

15. A non-transitory computer readable storage medium having stored thereon executable instructions to cause a computer to perform a method comprising
    dividing the input image into overlapping patches, normalizing the patches and transposing and/or flipping at least some of the normalized patches to obtain transposed and/or flipped normalized patches that according to predefined orientation characteristics all have the same orientation, wherein transposed and/or flipped normalized patches are obtained, and
    for each transposed and/or flipped normalized patch,
    determining a nearest neighbor patch among centroid patches of a plurality of trained clusters, and determining an upscaling projection matrix associated with the determined nearest neighbor patch;
    applying the determined upscaling projection matrix to the respective current transposed and/or flipped projected normalized patch, wherein a transposed and/or flipped upscaled normalized patch is obtained;
    applying inverse transposing and/or inverse flipping and de-normalizing to the upscaled normalized patch, according to said transposing and/or flipping and normalizing of the respective patch, wherein upscaled patches are obtained; and
    assembling the upscaled patches to obtain an upscaled image, wherein the upscaled patches overlap.

* * * * *